No. 755,199. PATENTED MAR. 22, 1904.
H. R. WELLMAN.
DEFLECTOR FOR FAN MOTORS.
APPLICATION FILED JUNE 18, 1903. RENEWED FEB. 19, 1904.
NO MODEL.

WITNESSES:
J. E. Pearson
Maud O'Connor

INVENTOR
H. R. Wellman
BY
Geo. H. Benjamin
ATTORNEY

No. 755,199. Patented March 22, 1904.

UNITED STATES PATENT OFFICE.

HAROLD ROBINSON WELLMAN, OF NEW YORK, N. Y., ASSIGNOR TO GENERAL INCANDESCENT ARC LIGHT COMPANY, OF NEW YORK, N. Y., A CORPORATION.

DEFLECTOR FOR FAN-MOTORS.

SPECIFICATION forming part of Letters Patent No. 755,199, dated March 22, 1904.

Application filed June 18, 1903. Renewed February 19, 1904. Serial No. 194,435. (No model.)

*To all whom it may concern:*

Be it known that I, HAROLD ROBINSON WELLMAN, a citizen of the United States, residing at New York city, county and State of New York, have invented certain new and useful Improvements in Deflectors for Fan-Motors, of which the following is a specification.

My invention consists of a device driven by the air-blasts of a fan-motor and which will give a uniform lateral oscillating movement to a series of pivoted shutters located in front of the fan-blades of the motor.

The object of the invention is to provide means for varying the direction of delivery of the air currents or blasts delivered from the fan of the motor.

The accompanying drawings show several equivalent constructions.

Figure 1:
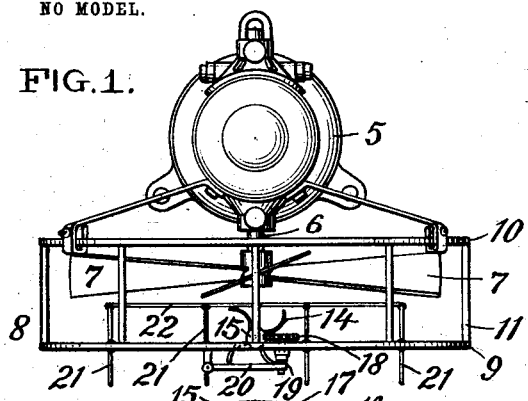
Figure 3:
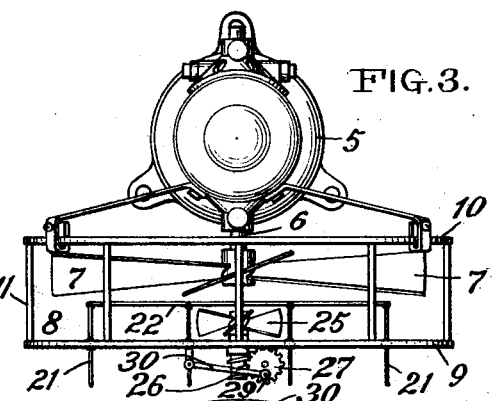
Figure 2:
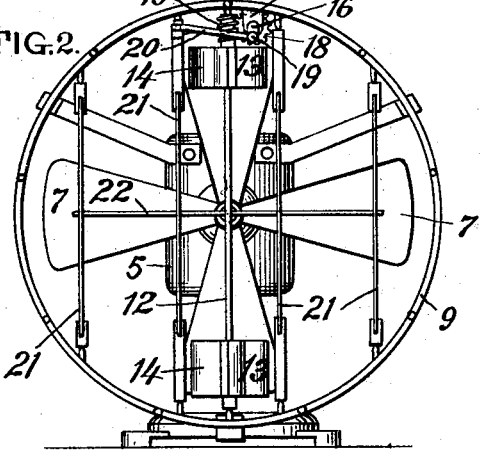

Figure 1 is a top view, and Fig. 2 a front view, of a construction where the propelling means is two fans, each consisting of a series of radially-disposed curved blades mounted upon a vertical shaft. Fig. 3 is a top view, and Fig. 4 a front view, of a construction where the propelling means is two fans, each consisting of a series of radially-disposed blades mounted upon horizonal shafts with the blades angularly arranged as regards each other. Fig. 5 is a front elevation, and Fig. 6 a side elevation, of a construction where the propelling means is two fans, each consisting of a series of radially-disposed blades upon a horizontal shaft with the shafts at right angles to the propelling-shaft of the motor.

Referring to the drawings, 5 represents an electromotor of any suitable type; 6, driven shaft; 7, fans mounted on shaft; 8, guard-frame. This frame, as is usual, consists of the front and rear members 9 10 and the transverse connecting members 11.

In Figs. 1 and 2, 12 represents a vertical shaft having its bearings in the front member 9. Mounted on the opposite ends of this shaft are the fans 13, each consisting of four curved blades 14. The number of blades is immaterial. Located upon the shaft 12 at the top is a worm 15. Mounted on the shaft 16, having its bearings in a bracket 17, depending from the front member 9, is a pinion 18. On the forward end of the shaft 17 is a crank-arm 19, to which is pivotally connected a link 20, secured to one of the flat shutters 21. Four shutters are connected together by means of the transverse rod 22. The shutters 21 are pivotally supported in the front member 9.

Figure 4:
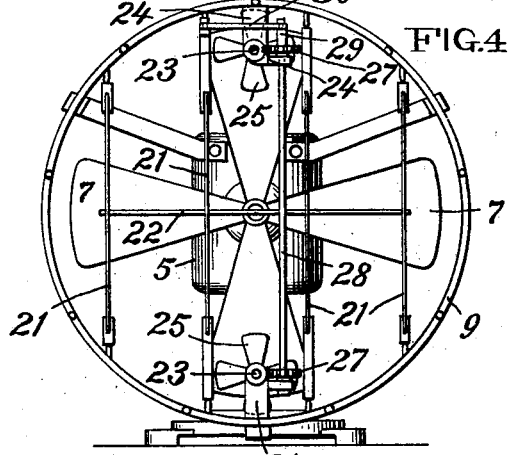
Figure 5:
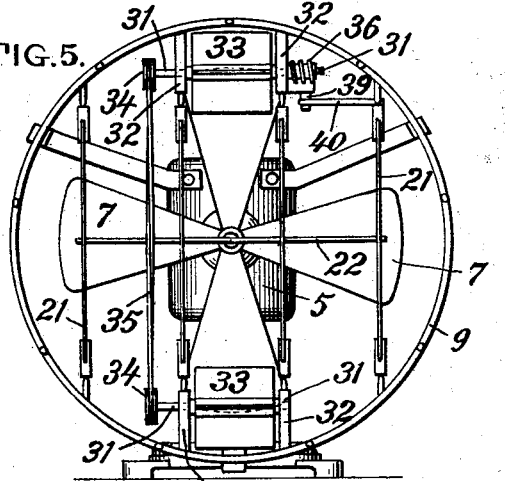

Referring to Figs. 3 and 4, 23 represents shafts carried in bearings in the ends of brackets 24, depending from the top and extending upward from the bottom of the member 9. Mounted on each shaft 23 are the fan-blades 25, angularly disposed as regards each other. Arranged on the forward end of each shaft 23 is a worm 26, which meshes with the pinion 27, located on shaft 28, which has its bearings in the brackets 24. Connected to the upper end of the shaft 28 is a crank-arm 29, to which is pivotally connected a link 30, fastened at its forward end to one of the shutters 21, which are secured together by the rod 22.

Figure 6:
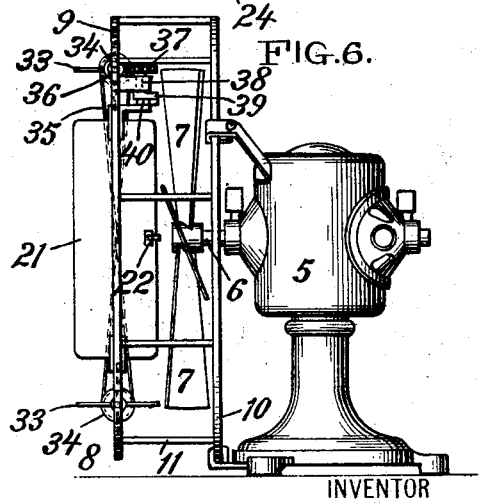

Referring to Figs. 5 and 6, 31 indicates two shafts supported in brackets 32, depending downward and extending upward from the front member 9. Mounted on these shafts are the fan-blades 33. On the left-hand end of each shaft 31 is a pulley 34. The pulleys 34 are connected by a cross-belt 35. Mounted on the right-hand end of the upper shaft 31 is a worm 36, which meshes with the gear 37, mounted on shaft 38, which has its bearings in one of the brackets 32. On the lower end of the shaft 37 is a crank-arm 39, connected through a link 40 with one of the shutters 21, which are connected together by the rod 22.

The operation of each device is essentially the same. The air-blasts from the fan 7 impinge upon the blades of the small fans, setting them in rotation and imparting motion to the pinions, which motion is communicated through the links to the shutters, thereby giving the shutters a to-and fro motion or otherwise oscilating them on their pivots.

I wish it understood that I do not limit myself to the particular construction shown, as various other arrangements may be made by means of which the air-blasts from the fan of the motor may be employed to oscillate the shutters to change the direction of delivery of the air-currents.

Having thus described my invention, I claim—

1. The combination with a fan-motor, of an air-deflector, and means driven by the air-blasts from the motor for moving the blades of the deflector.

2. The combination with a fan-motor, of a series of air-deflector blades, and means driven by the air-blasts from the motor for moving said blades.

3. The combination with a fan-motor, of a fan-guard, a series of deflector-blades pivoted in said guard, and means for oscillating said blades driven by the air-blasts from the motor.

4. The combination with a fan-motor, of a fan-guard, a device carried by said guard adapted to be driven by an air-blast from the motor, and a series of deflector-blades mounted in said guard and adapted to be moved by said air-driven device.

5. The combination with a fan-motor, a fan-guard, an air-driven device mounted in front of the fan of the motor, and a series of deflector-blades also in front of the fan of the motor and adapted to be moved by said air-driven device.

6. The combination with a fan-motor, an air-driven device located in front of said fan, a series of air-deflectors, and means for communicating the motion of the air-driven device to the deflectors.

7. The combination with a fan-motor, of a small fan situated in front of the fan of said motor, a shaft on which said first-named fan is mounted, a worm on said shaft, a second shaft carrying a pinion coöperating with the worm, a series of deflector-blades, and means interposed between the shaft carrying the pinion and the deflector-blades for oscillating the deflector-blades.

8. A deflector for air-currents, comprising a series of pivoted parallel blades, and a device energized by a delivered air-current for oscillating said blades.

In testimony whereof I affix my signature in the presence of two witnesses.

HAROLD ROBINSON WELLMAN.

Witnesses:
I. WERTHEIMER,
C. W. WELLMAN.